United States Patent
Hubbard et al.

(10) Patent No.: US 12,055,769 B2
(45) Date of Patent: Aug. 6, 2024

(54) TERMINAL FORMED BY SEQUENTIALLY ASSEMBLED MODULES

(71) Applicant: COMMSCOPE TECHNOLOGIES LLC, Hickory, NC (US)

(72) Inventors: Paul David Hubbard, Iron Station, NC (US); David Albert De Craemer, Kessel-Lo (BE); Jan Jozef Julia Maria Erreygers, Tielt-Winge (BE)

(73) Assignee: CommScope Technologies LLC, Hickory, NC (US)

( * ) Notice: Subject to any disclaimer, the term of this patent is extended or adjusted under 35 U.S.C. 154(b) by 246 days.

(21) Appl. No.: 17/782,491

(22) PCT Filed: Dec. 4, 2020

(86) PCT No.: PCT/US2020/063418
§ 371 (c)(1),
(2) Date: Jun. 3, 2022

(87) PCT Pub. No.: WO2021/113717
PCT Pub. Date: Jun. 10, 2021

(65) Prior Publication Data
US 2023/0168443 A1    Jun. 1, 2023

Related U.S. Application Data

(60) Provisional application No. 62/944,119, filed on Dec. 5, 2019.

(51) Int. Cl.
*G02B 6/00* (2006.01)
*G02B 6/38* (2006.01)
*G02B 6/44* (2006.01)

(52) U.S. Cl.
CPC ......... *G02B 6/3897* (2013.01); *G02B 6/3825* (2013.01); *G02B 6/4473* (2013.01)

(58) Field of Classification Search
CPC .. G02B 6/3897; G02B 6/3825; G02B 6/4473; G02B 6/00
See application file for complete search history.

(56) References Cited

U.S. PATENT DOCUMENTS 7,264,402 B2    9/2007 Theuerkorn et al.
7,568,844 B2    8/2009 Luther et al.
(Continued)

FOREIGN PATENT DOCUMENTS

WO    2018/231833 A1    12/2018

OTHER PUBLICATIONS

International Search Report and Written Opinion of the International Searching Authority for International Patent Application No. PCT/US2020/063418 mailed Mar. 25, 2021, 8 pages.

*Primary Examiner* — Jennifer Doan
(74) *Attorney, Agent, or Firm* — Merchant & Gould P.C.

(57) ABSTRACT

A terminal includes modules adapted to be sequentially assembled together in a serial chain to build the terminal. At least some of the modules each include a module housing, a ruggedized optical output port provided on the module housing, a plug and play input connection location, a plug and play expansion connection location provided on the module housing, and an asymmetric power splitter within the module housing for splitting optical power from the plug and play input location asymmetrically between the ruggedized optical output port and the plug and play expansion connection location. The plug and play input connection locations and the plug and play expansion connection locations of adjacent modules in the serial chain are adapted to mate with respect to one another.

20 Claims, 20 Drawing Sheets

(56) References Cited

U.S. PATENT DOCUMENTS

| | | | |
|---|---|---|---|
| 7,744,288 B2 | 6/2010 | Lu et al. | |
| 9,122,021 B2 | 9/2015 | Elenbaas et al. | |
| 9,557,493 B2 | 1/2017 | Wu et al. | |
| 10,585,256 B1 * | 3/2020 | Henley | G02B 6/3807 |
| 11,150,421 B2 * | 10/2021 | Lv | G02B 6/4208 |
| 11,223,442 B2 | 1/2022 | Mather et al. | |
| 11,531,170 B2 * | 12/2022 | Takeuchi | G02B 6/02052 |
| 2005/0163448 A1 | 7/2005 | Blackwell et al. | |
| 2006/0093278 A1 | 5/2006 | Elkins, II et al. | |
| 2013/0004122 A1 | 1/2013 | Kingsbury | |
| 2018/0048392 A1 | 2/2018 | Amundson | |

* cited by examiner

TERMINAL FORMED BY SEQUENTIALLY ASSEMBLED MODULES

CROSS-REFERENCE TO RELATED APPLICATION

This application is a National Stage Application of PCT/US2020/063418, filed on Dec. 4, 2020, which claims the benefit of U.S. Patent Application Ser. No. 62/944,119, filed on Dec. 5, 2019, the disclosures of which are incorporated herein by reference in their entireties. To the extent appropriate, a claim of priority is made to each of the above disclosed applications.

TECHNICAL FIELD

The present disclosure relates generally to telecommunication enclosures such as multi-service terminals having outside accessible connector ports adapted to be coupled to drop cables.

BACKGROUND

FIG. 1 depicts a cascaded passive optical network (PON) architecture. The architecture includes a primary splitter 20 positioned at a more centralized location such as a hub and a second splitter 22 positioned at an outer edge of the network. The splitters 20, 22 are passive optical power splitters. The second splitter 22 typically is installed at the time an initial customer requests activation. Commonly, the second splitter 22 is a one-by-eight splitter with one of the eight output ports being used by the initial customer and the remaining seven output ports being available for future customers. The deployment of a splitter having seven unused ports is not efficient since so many of the ports are initially unused. Utilization can be improved by using a one-by-four optical power splitter as the secondary splitter. However, four ports are seldomly sufficient to satisfy future demand for a given geographical location.

SUMMARY

Aspects of the present disclosure relate to a modular terminal structure that allows optical ports to be added in the field upon demand to create a local tap network. In certain aspects, the tap network effectively defers deployment costs until service is actually requested. For example, the addition of ports to the network can be coordinated with customer activation requests so that port installation costs coincide with service activation requests.

Another aspect of the present disclosure relates to a terminal including a plurality of modules adapted to be sequentially assembled together to build the terminal. At least some of the modules each include a module housing, an optical output port provided on the module housing, and an asymmetric power splitter within the module housing adapted for tapping optical power from an optical signal transmitted through the terminal and for outputting a tapped portion of the optical signal through the optical output port. The module housings are configured to be mechanically coupled together to form an integrated terminal structure.

Another aspect of the present disclosure relates to a terminal including a plurality of modules adapted to be sequentially assembled together in a serial chain to build the terminal. The serial chain can include one or more rows of modules coupled together to form an integrated terminal. At least some of the modules each include a module housing, an optical output port provided on the module housing, a plug and play input connection location, a plug and play expansion connection location provided on the module housing, and an asymmetric power splitter within the module housing for splitting optical power from the plug and play input location asymmetrically between the optical output port and the plug and play expansion connection location. The plug and play input connection locations and the plug and play expansion connection locations of adjacent modules are adapted to mate with respect to one another.

A further aspect of the present disclosure relates to a terminal including a plurality of modules adapted to be sequentially assembled together to build the terminal. The modules can include a base module, a plurality of intermediate expansion modules, and an end module. In certain examples, the modules can couple together in one or more rows. In certain examples, at least some of the modules can include asymmetric power splitters having different split ratios. In certain examples, the modules can each include at least one optical output port. In certain examples, the optical output ports are ruggedized. In certain examples, the modules can be interconnected by plug and play connections.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
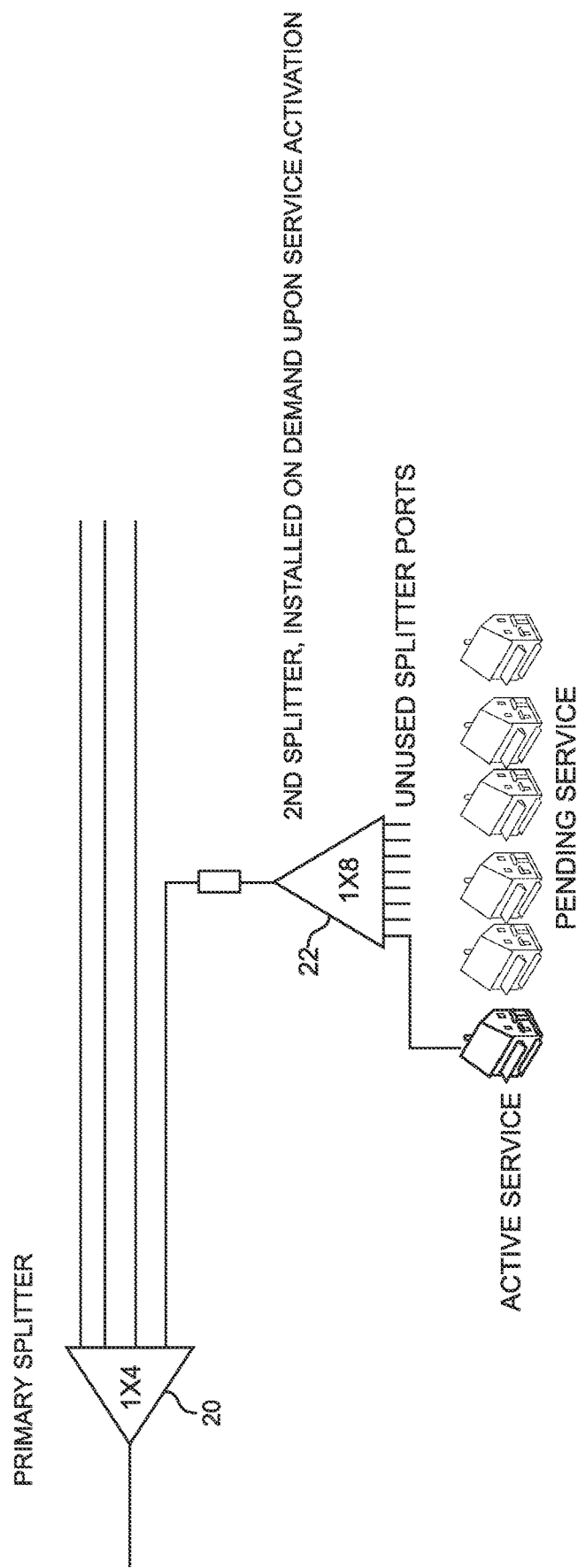
FIG. 1 depicts a prior art passive optical network architecture.
Figure 2:
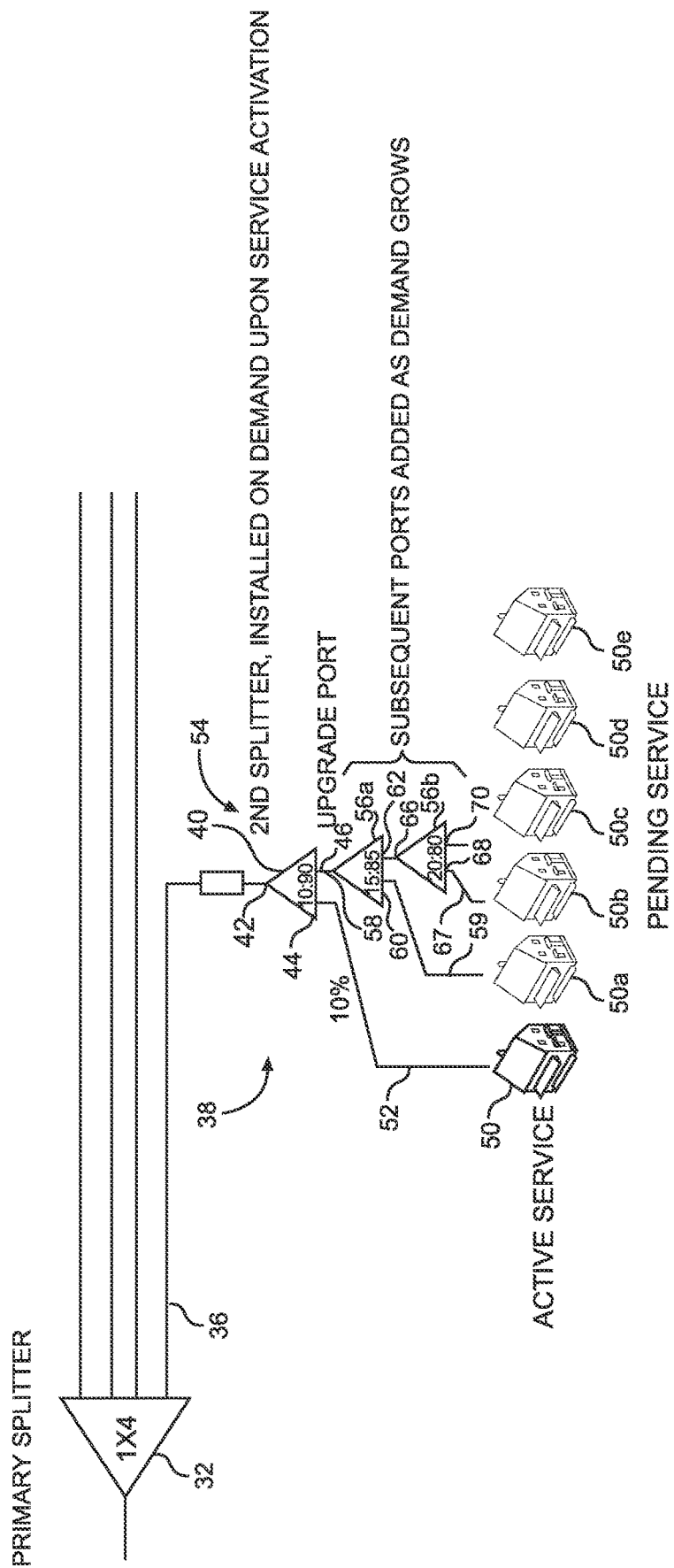
FIG. 2 schematically depicts a local tap network including a modular terminal in accordance with the principles of the present disclosure.

FIG. 2 schematically depicts an example passive optical network in accordance with the principles of the present disclosure. In the depicted example, the passive optical network 30 is a "tap network" that includes asymmetric optical power splitters for tapping portions of an optical signal and for outputting the tapped portions to output ports. The passive optical network 30 includes a first splitter 32 positioned at a more centralized location such as a hub. In the depicted example, the first splitter 32 is a one-by-four splitter, but in alternative examples other split ratios can be utilized. The first splitter 32 is a passive optical power splitter that preferably uniformly splits optical power between a plurality of optical lines. One of the optical lines 36 is routed to a terminal location 38 that is preferably near an outer edge of the passive optical network 30. At the time of initial installation, the terminal location 38 is provided with a base module 40 having an input 42 that couples to the optical line 36, an output port 44, and an expansion port 46. The base module 40 contains an asymmetric power splitter that asymmetrically splits an optical signal provided to the base module 40 by the optical line 36 through the input 42. In certain examples, the asymmetrical splitter 48 taps a smaller portion of the optical signal from the optical line 36 and directs the tapped optical signal to the output port 44. The remainder of the signal is directed from the asymmetric splitter toward the expansion port 46. The output port 44 can provide service to a subscriber 50 via a drop cable 52 routed from the output port 44 to the subscriber 50.

It will be appreciated that a terminal 54 can be sequentially built over time at the terminal location 38. Preferably, the terminal 54 has a number of output ports that matches the number of subscribers in need of service. In certain examples, terminal 54 can be sequentially built over time by adding modules to the base module 40. In the example of FIG. 2, where only one subscriber 50 is initially in need of service, the terminal 50 initially can include only the base module 40 having a single port 44 corresponding to the subscriber 50. However, it will be appreciated that over time, future subscribers 50a-50e in the vicinity of the terminal location 38 may request service.

It will be appreciated that additional modules can be added to the base module 40 as demand for service increases and service activations are requested by subscribers. For example, when the subscriber 50a requests service activation at some time after initial deployment of the passive optical network 30, a first expansion module 56a can be coupled to the base module 40 to provide an additional output port to the terminal 54. The first expansion module 56a can include an input 58 that optically couples to the expansion port 46 of the base module 40, an output port 60 and an expansion port 62. The first expansion module 56a can contain an asymmetric power splitter that taps a portion of the optical signal from the input 58 and directs the tapped portion to the output port 60. An untapped portion of the optical signal from the input 58 (i.e., the remaining portion of the signal that was not directed to the output port 60) is directed from the asymmetric power splitter to the expansion port 62. A drop cable 59 can be used to connect the subscriber 50a to the output port 60.

It will be appreciated that the split ratio of the asymmetric power splitter used in the module 56a is selected such that the tapped portion of the optical signal sent to the output port 60 is substantially smaller than the portion of the optical signal directed through the asymmetric power splitter to the expansion port 62. It will also be appreciated that as modules are sequentially added to build the terminal 54, the split ratio of the asymmetric power splitters used in the modules can change. For example, downstream modules can include asymmetric power split ratios that direct a larger percentage of the optical signal to their corresponding output ports. In certain examples, the asymmetric split ratios vary between modules so that the power level provided to each of the subscribers is generally the same.

When subscriber 50b requests service activation, a second expansion module 56b can be added to the terminal 54 by coupling the second expansion module 56b to the first expansion module 56a. The second expansion module 56b includes an input port 66 that couples to the expansion port 62 of the first expansion module 56a, an output port 68 and an expansion port 70. An asymmetric power splitter splits the optical power of an optical signal received into the second expansion module 56b through the input port 66 between the output port 68 and the expansion port 70. The subscriber 50b can be connected to the terminal 54 by a drop cable 67 routed from the output port 68 of the second expansion module 56b to the subscriber 50b. It will be appreciated that as additional subscribers request service in the vicinity of the terminal location 38, additional expansion modules can be sequentially assembled together in a serial chain to build and expand the capacity of the terminal 54.

Figure 3:
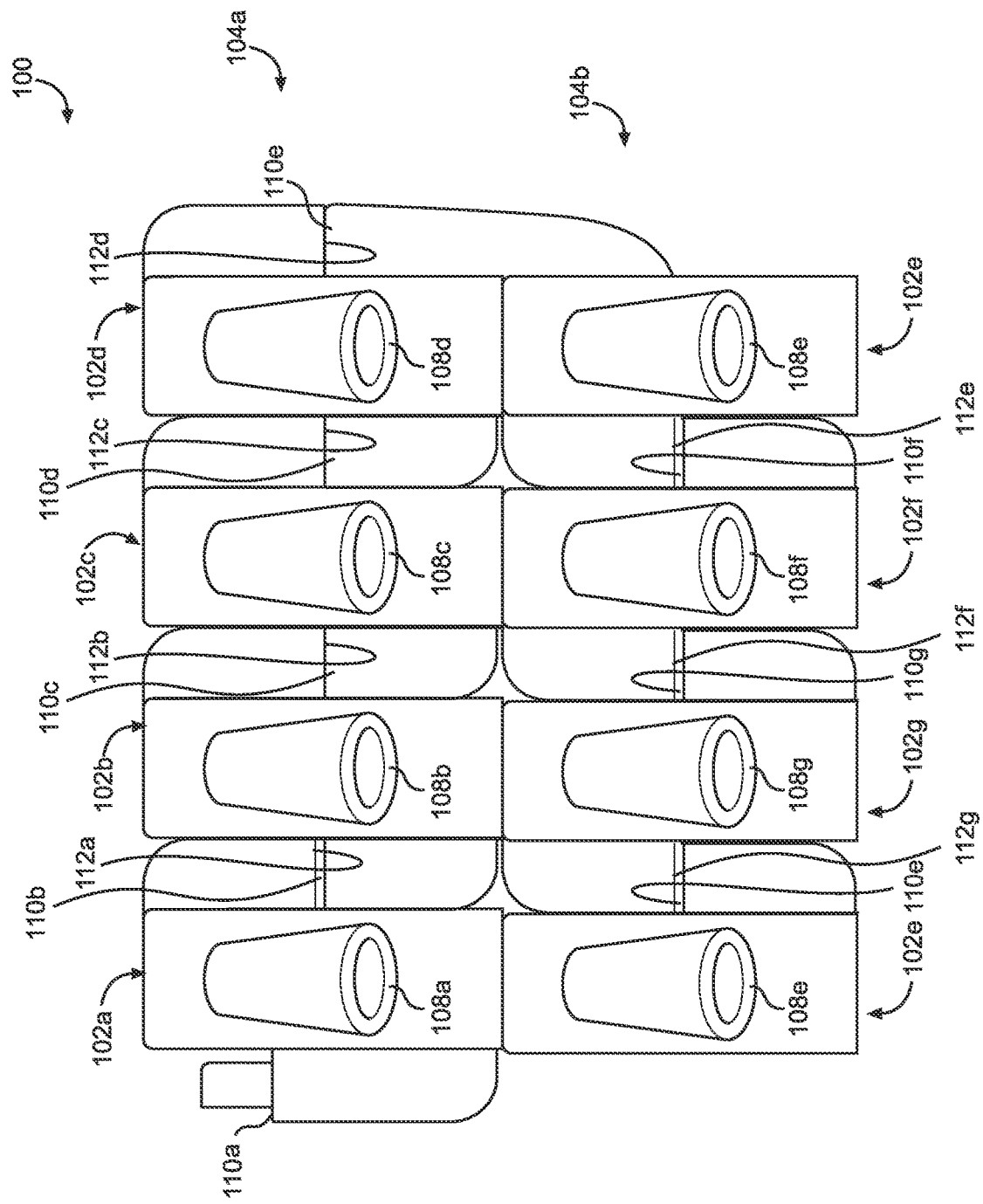
FIG. 3 depicts a modular terminal in accordance with the principles of the present disclosure.

FIG. 3 depicts an example terminal 100 that can be used at a terminal location such as the terminal location 38 of the passive optical network 30 of FIG. 2. The terminal 100 includes a base module 102a, a first expansion module 102b, a second expansion module 102c, a third expansion module 102d, a fourth expansion module 102e, a fifth expansion module 102f, a sixth expansion module 102g and an end module 102h. The modules 102a-102h are adapted to be sequentially assembled together in a serial chain to build the terminal 100. Preferably, the serial chain includes at least one row of expansion modules. As depicted, the serial chain of modules includes a first row 104a of modules defined by the base module 102a, the first expansion module 102b, the second expansion module 102c and the third expansion module 102d and a second row 104b defined by the fourth expansion module 102e, the fifth expansion module 102f, the sixth expansion module 102g and the end module 102h. In certain examples, the fourth expansion module 102e has a wrap-around connection arrangement for wrapping from the first row 104a to the second row 104b. The remainder of the expansion modules 102b-102d and 102f-102h have an inline connection arrangement for coupling the modules together along a continuous row.

Figure 4:
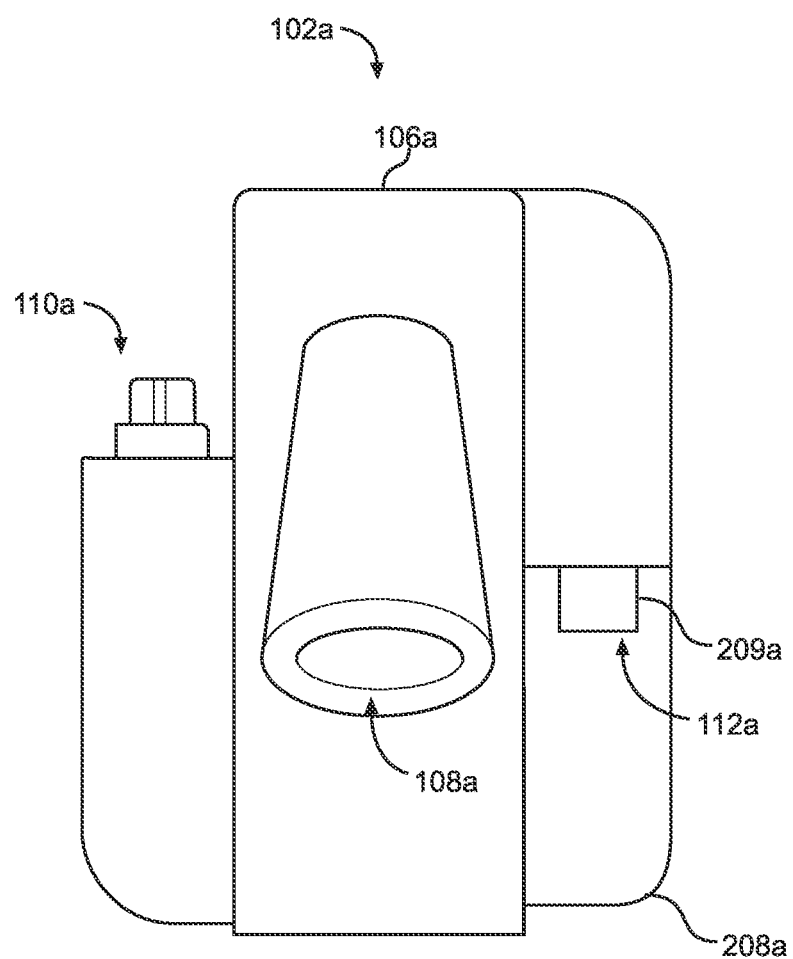
FIG. 4 depicts a base module of the modular terminal of FIG. 3.
Figure 5:
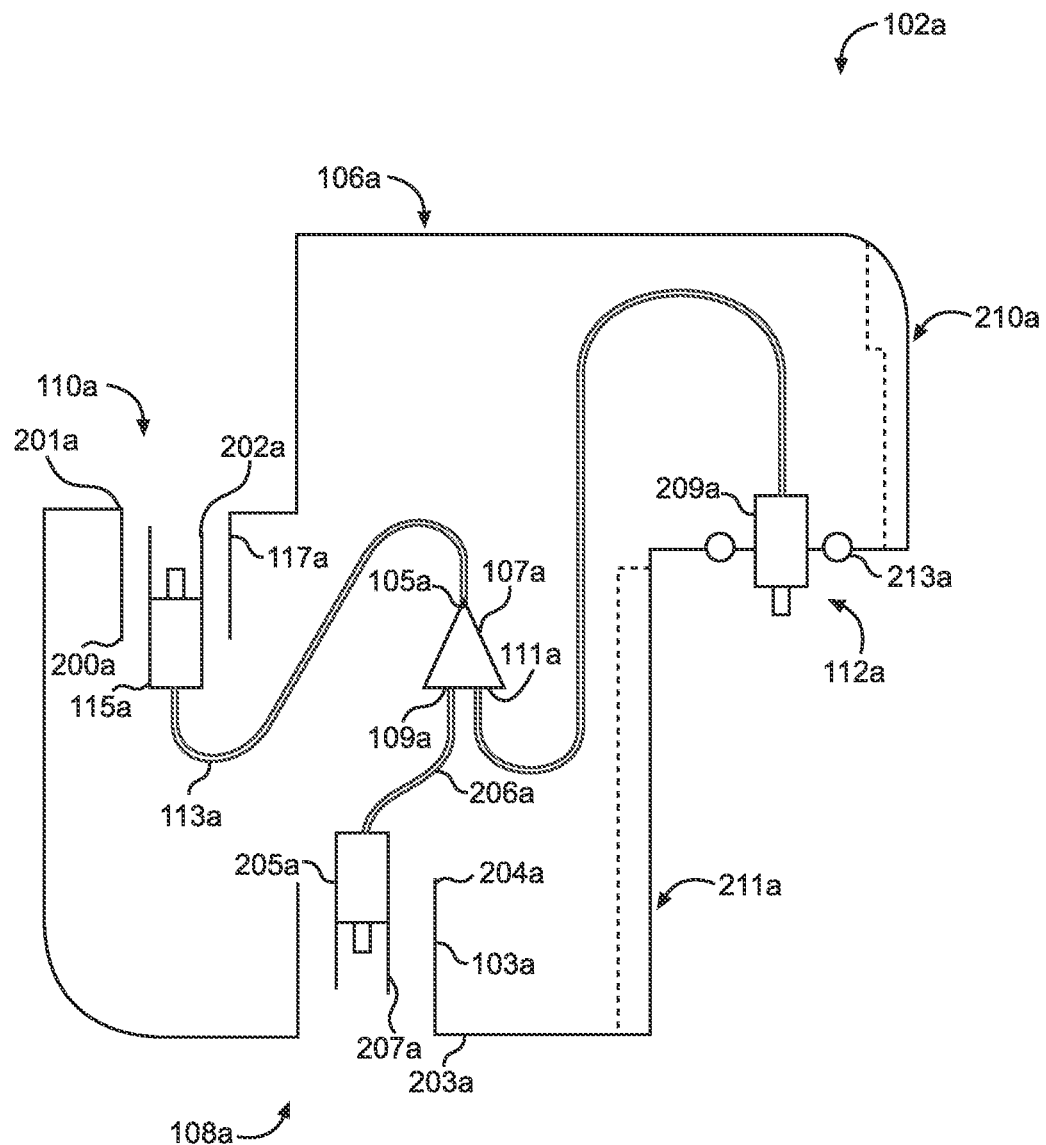
FIG. 5 is a schematic view of the base module of FIG. 4.

Referring to FIGS. 4 and 5, the base module 102a includes a module housing 106a. An optical output location 108a, an input location 110a and an expansion connection location 112a are provided on the module housing 106a. The module housing 106a contains a passive optical power splitter such as an asymmetric optical power splitter 107a having an splitter input 105a, a tap output 109a and a pass-through output 111a. The asymmetric power splitter 107a directs a smaller percentage of the input signal to the tap output 109a as compared to the pass-through output 111a. In one example, the asymmetric power splitter 107a can have a split bias of 95/5 such that 5% of the signal from the input 105a is tapped and diverted to the tap output 109a while the remaining 95% of the optical signal is passed through to the pass-through output 111a.

Referring to FIG. 5, an input fiber 113a connects the splitter input 105a to the input location 110a such that an optical transmission path is provided therebetween. The input fiber 113a has a connectorized end 115a that is received within an inner port 200a of a fiber optic adapter 117a provided at the input location 110a. An outer port 201a of the fiber optic adapter 117a is adapted to receive a connectorized end of an input cable (e.g., optical line 36) such that the input cable is optically coupled to the input fiber 113a. The fiber optic adapter 117a can include a ferrule alignment sleeve 202a for aligning a ferrule of the connectorized end 115a and a ferrule of the connector terminating the optical line 36. In one example, the outer port 201a can have a hardened (i.e., ruggedized) configuration.

In certain examples, the optical output location 108a can include a fiber optic adapter 103a including an outer port 203a adapted for receiving a fiber optic connector (e.g., a fiber optic connector that connectorizes the end of a drop cable) from outside the base module 102a and an inner port 204a for receiving a fiber optic connector from inside the base module 102a. In the depicted example, the inner port 204a receives a connectorized end 205a of a tap fiber 206a that connects to the splitter tap output 109a such that an optical transmission path is provided between the tap output 109a and the optical output location 108a. The fiber optic adapter 103a includes a ferrule alignment sleeve 207a for aligning a ferrule of the connectorized end 205a with a ferrule of a connector received within the outer port 203a. In a preferred example, the output port 203a has a hardened configuration.

In certain examples, the expansion connection location 112a can have a plug and play configuration that can be covered, protected and sealed by a removable cap 208a when not in use. The expansion connection location 112a includes a plug and play connector 209a coupled to the module housing 106a. The plug and play connector 209a is covered by the cap 208a when not in use, and is accessible from outside the module housing 106a when the cap is removed. The plug and play configuration can include a seal 213a (e.g., an o-ring seal) for sealing with respect to the cap 208a or with respect to an expansion module mounted to the base module 102a at the expansion connection location 112a. The plug and play configuration includes a latch interface 210a (e.g., a catch) adapted to engage a corresponding latch interface of the cap 208a or a latch interface of an expansion module desired to be coupled to the base module at the expansion connection location 112a. In this way, the cap 208a or expansion module can be latched to the base module 102a at the expansion connection location. A tongue and groove connection interface 211a (e.g., a groove) can also be used to enhance securement of the cap or the expansion module to the expansion connection location 112a. In other examples, alternative securement techniques (e.g., fasteners such as turn-to-secure fasteners, clips, etc.) could be used. The plug and play connector 209a terminates the end of a pass-through optical fiber 212a that extends between the plug and play connector 209a and the splitter pass-through output 111a to provide an optical transmission path between the splitter pass-through output 111a and the expansion connection location 112a.

In certain examples, certain optical adapters used in modules in accordance with the principles of the present disclosure can have a hardened configuration and can define hardened ports. Generally, a hardened port is adapted to receive a hardened fiber optic connector with sealing provided so that the port is environmentally sealed when the fiber optic connector is secured therein. In certain examples, environmental seals for providing such sealing are carried with the fiber optic connector, provided at the port, or both. Generally, a hardened port has a robust securement interface such as a threaded interface or a bayonet-type interface that interlocks with a mating interface provided on a fastening element of the hardened fiber optic connector for retaining the fiber optic connector in the port. Typically, when the hardened fiber optic connector of a drop cable is inserted within a hardened port of a fiber optic adapter, the fiber optic connector of the drop cable optically connects to a corresponding fiber optic connector within an inner port of the fiber optic adapter.

Figure 6:
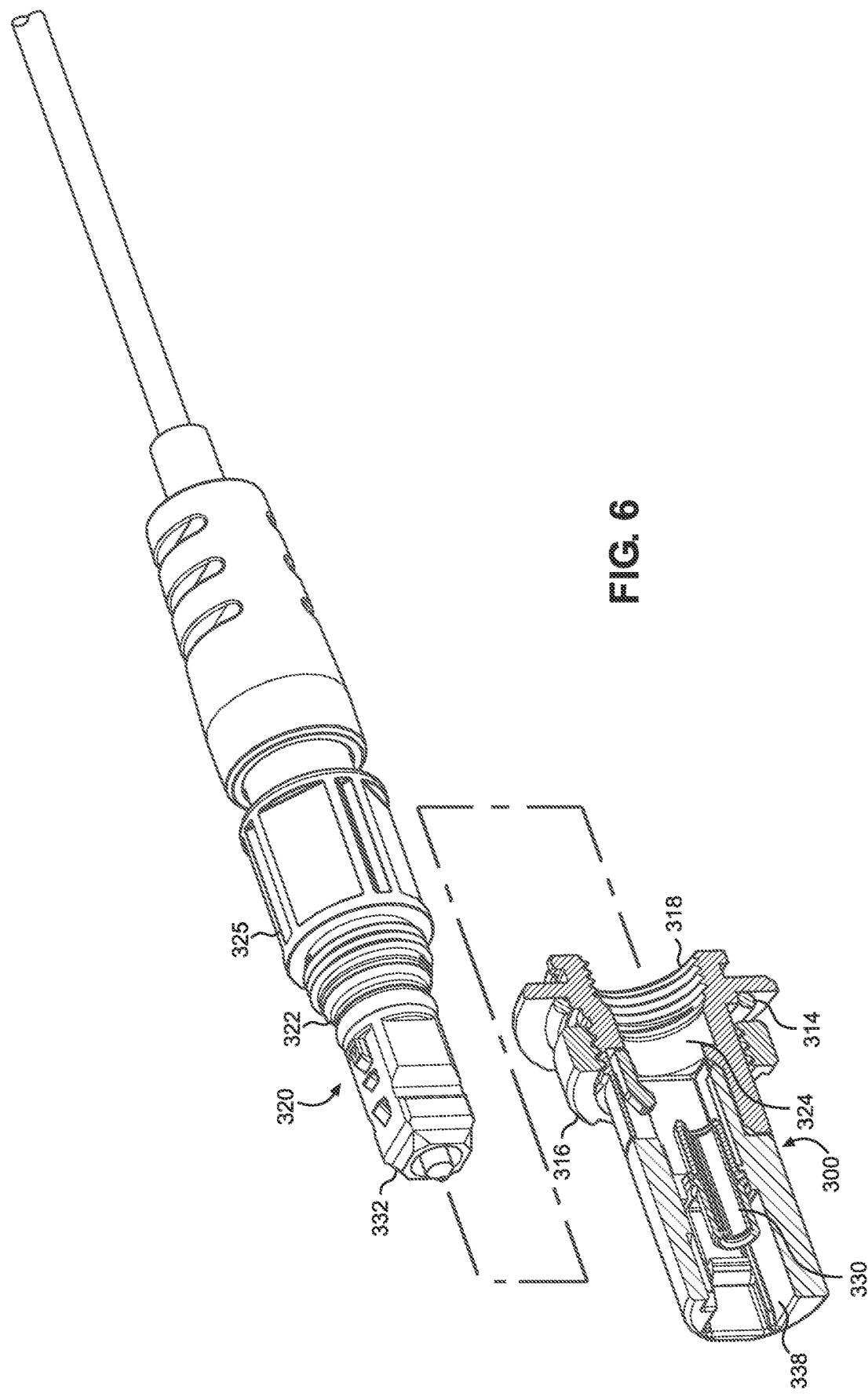
FIG. 6 depicts a hardened fiber optic adapter port and mating hardened fiber optic connector suitable for use with modules in accordance with the principles of the present disclosure.

FIG. 6 shows an example configuration for a hardened fiber optic adapter 300 that is one example of a way to define hardened ports in any of the modules disclosed herein. The adapter 300 is adapted to be mounted in sealed relation relative to a housing of a module. For example, seal 314 can seal against the outside of the module housing and nut 316 can be used to secure the adapter 300 within an opening in the module housing. The hardened fiber optic adapter includes an outer port 318 for receiving a hardened fiber optic connector 320. Either the adapter 300 or the connector 320 preferably has a seal for providing environmental sealing between the adapter 300 and the connector 320 when the connector 320 is inserted in the outer port 318. As depicted, the connector 320 includes a seal 322 that seals against a sealing surface 324 of the outer port 318 when the connector 320 is inserted therein. The connector 320 also includes a twist-to-secure fastener 325 (e.g., a threaded fastener, a bayonet-style fastener or other structure) that interlocks with a corresponding twist-to-secure fastening arrangement (e.g., threads or bayonet configuration) provided on the adapter 300 to secure the connector 320 within the outer port 318. The adapter 300 also includes internal alignment sleeve 330 for aligning a ferrule 332 of the optical connector 320 with a ferrule of a fiber optic connector that is loaded within an internal port 338 (e.g., a port that is inside the module housing) of the adapter 300. In this way, when the connectors are loaded in their respective ports, their ferrules are aligned and an optical connection is made between optical fibers supported by the ferrules.

Figure 7:
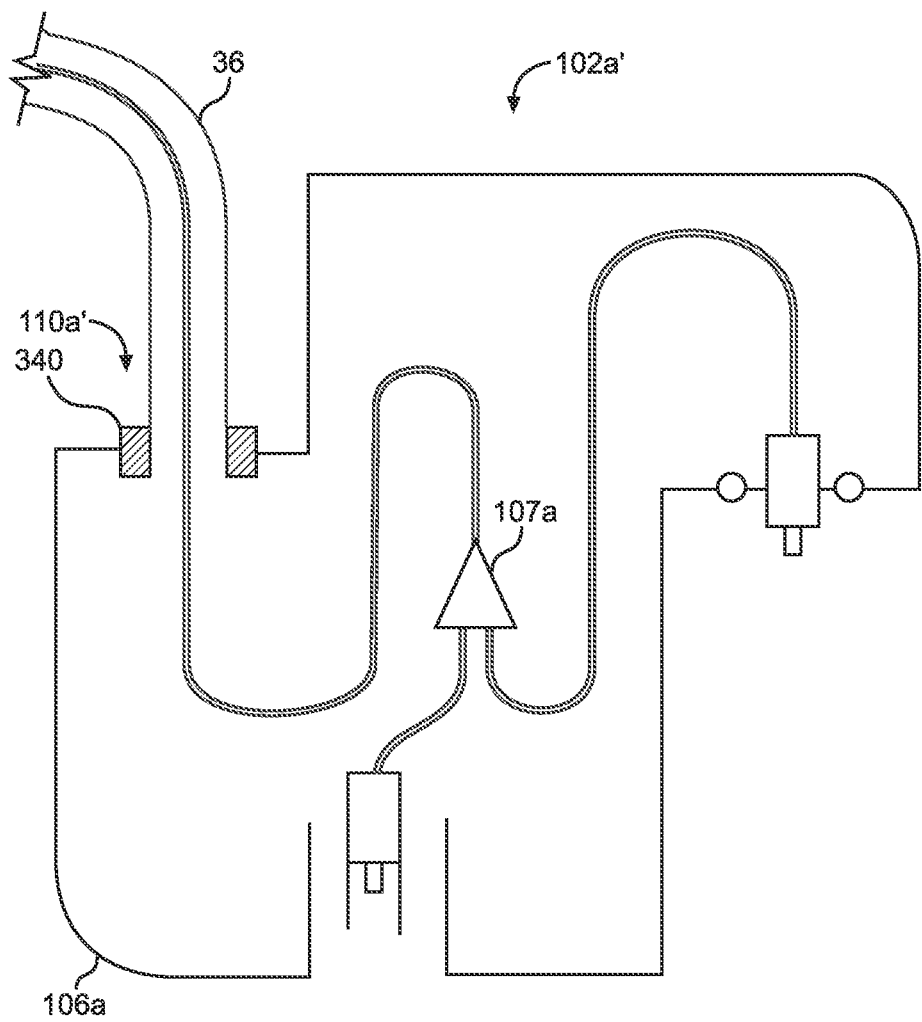
FIG. 7 schematically depicts an alternative configuration for the base module of FIGS. 4 and 5.

The input location of a base module is adapted for inputting an optical signal into the base module. In certain examples, such as the base module 102a of FIGS. 4 and 5, the input location 110a can include a fiber optic adapter, a fiber optic connector and/or combinations thereof for allowing an input cable to be plugged into the input location such that an optical fiber of the input cable can be optically connected to an input of the asymmetric splitter. In other examples, such as the base module 102a' of FIG. 7, an input location 110a' may include a cable seal 340 for allowing the optical cable 36 to be routed through the input location 110a' and into the interior of the module housing 106a where an optical fiber of the cable can be connected (e.g., spliced) to the input of the asymmetric optical power splitter 107a. Aside from the input locations 110a, 110a', the base modules 102a, 102a' have the same basic constructions.

Figure 8:
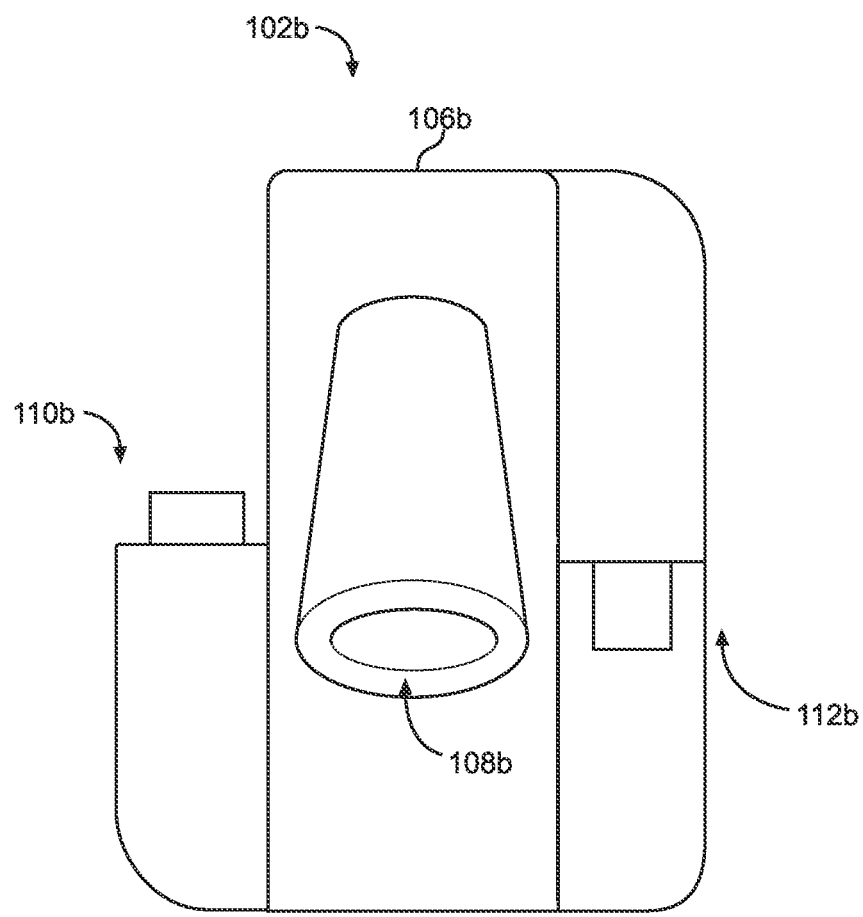
FIG. 8 depicts an in-line expansion module configuration for an expansion module of the modular terminal of FIG. 3.
Figure 9:
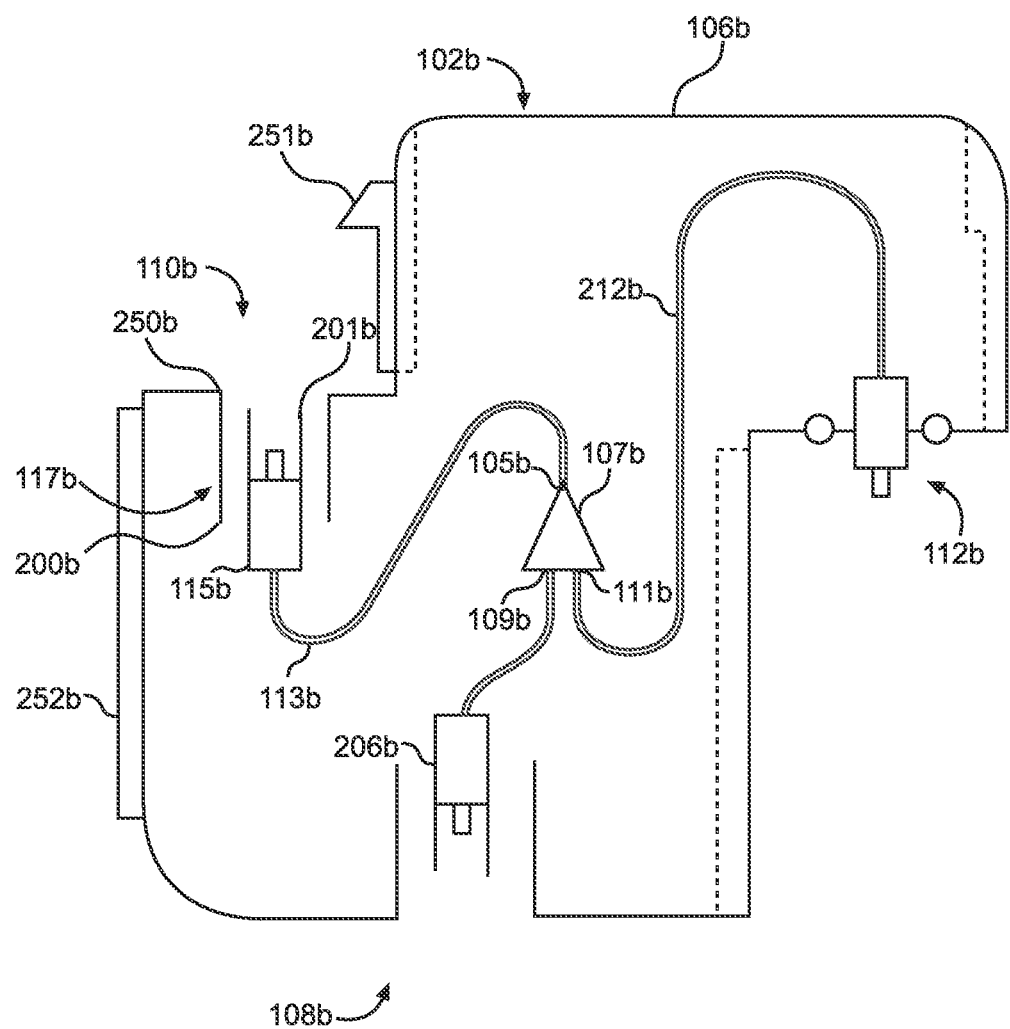
FIG. 9 is a schematic view of the expansion module of FIG. 8.

Referring to FIGS. 8 and 9, the first expansion module 102b includes a module housing 106b having an optical output location 108b, an optical input location 110b and an expansion connection location 112b. The module housing 106b contains an asymmetric optical power splitter 107b having an splitter input 105b, a tap output 109b and a pass-through output 111b. The asymmetric power splitter 107a directs a smaller percentage of the input signal to the tap output 109b as compared to the pass-through output 111b. In one example, the asymmetric power splitter 107b can have a split bias of 95/5 such that 5% of the signal from the input 105b is tapped and diverted to the tap output 109b while the remaining 95% of the optical signal is passed through to the pass-through output 111b. An input fiber 113b provides an optical transmission path between the splitter input 107b and the input location 110b. A tap fiber 206b provides an optical transmission path between the splitter tap output 109b and the output location 108b. A pass-through fiber 212b provides an optical transmission path between the splitter pass-through output 111b and the expansion connection location 112b.

The input location 110b has a plug and play configuration adapted to mate and optically connect with the expansion connection location 112a of the base module 102a. For example, the input location 110b includes a fiber optic adapter 117b having an inner port 200b that receives a fiber optic connector 115b terminating the input fiber 113a within the module housing, and an outer port 201b for receiving the plug and play connector 209a to provide an optical connection between the connectors 115b, 209a. The input location includes a sealing surface 250b for sealing against the seal 213a, a latch interface 251b (e.g., a latch) for interlocking with the latch interface 210a, and a tongue and groove interface 252b (e.g., a tongue) for mating with the tongue and groove interface 211a. The output location 108b has the same configuration as the output location 108a and the expansion connection location 112b has the same configuration as the expansion connection location 112a. It will be appreciated that the input location 110b and the expansion connection location 112b are positioned at opposite ends of the module housing 106b and face in opposite directions. The module housing 106b defines a notched region for providing mechanical reinforcement to the plug and play connection provided at the expansion connection location when modules are coupled together.

The second expansion module 102c has the same configuration as the first expansion module 102b, except the second expansion module 102c includes a asymmetric optical power splitter with a split ratio selected such that a larger percentage of the input signal is tapped and a smaller percentage of the optical signal is passed through. In one example, the asymmetric power splitter can have a 90/10 bias such that 10% of the signal from the input location is directed to the output location while the remaining 90% of the signal from the input location is directed to the expansion connection location. The second expansion module 102c includes an optical input location 110c, an optical output location 108c and an expansion connection location 112c. The input location 110c of the second expansion module 102c is configured to mechanically and optically couple with the expansion connection location 112b of the first expansion module 102b (e.g., see FIG. 3) via a plug and play connection.

The third expansion module 102d has the same configuration as the second expansion module 102c, except the third expansion module 102d includes a asymmetric optical power splitter with a split ratio selected such that a larger percentage of the input signal is tapped and a smaller percentage of the optical signal is passed through. In one example, the asymmetric power splitter can have a 85/15 bias such that 15% of the signal from the input location is directed to the output location while the remaining 85% of the signal from the input location is directed to the expansion connection location. The third expansion module 102d includes an optical input location 110d, an optical output location 108d and an expansion connection location 112d. The optical input location 110d of the third expansion module 102d is configured to mechanically and optically couple with the expansion connection location 112c of the second expansion module 102c (e.g., see FIG. 3) via a plug and play connection.

Figure 10:
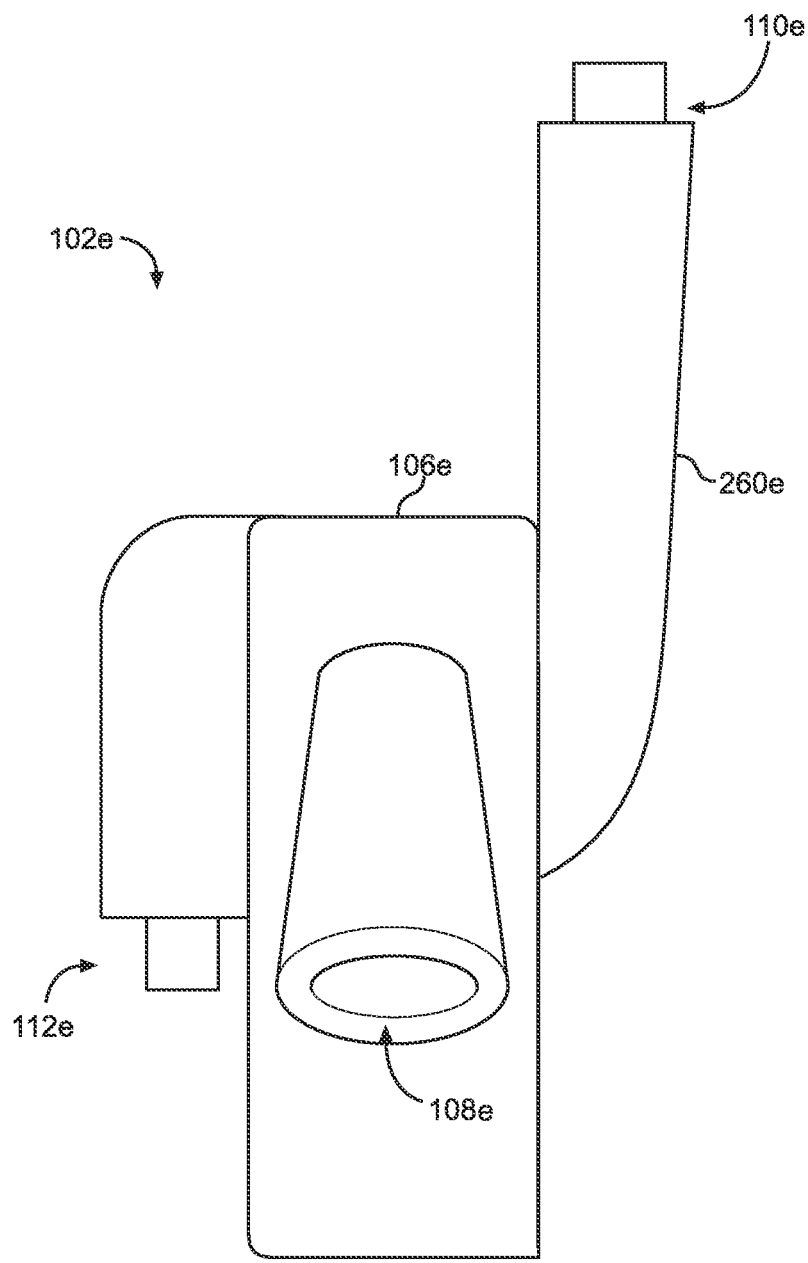
FIG. 10 depicts a wrap-around expansion module of the modular terminal of FIG. 3.
Figure 11:
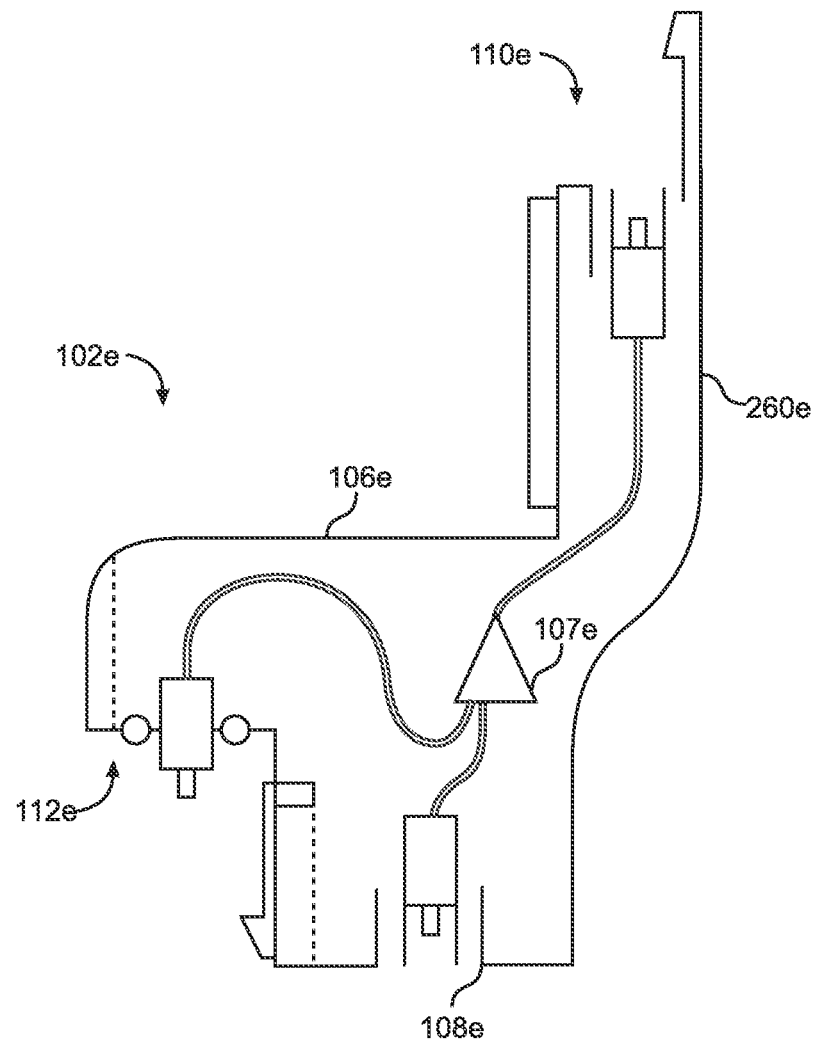
FIG. 11 is a schematic view of the wrap-around expansion module of FIG. 10.

FIGS. 10 and 11 depict the fourth expansion module 102e. The fourth expansion module 102e includes a module housing 106e, an optical input location 110e, an optical output location 108e and an expansion connection location 112d. The optical input location 110e of the fourth expansion module 102e is configured to mechanically and optically couple with the expansion connection location 112d of the third expansion module 102d (e.g., see FIG. 3) via a plug and play connection.

The fourth expansion module 102e has a wrap-around mechanical configuration that is different from the configurations of the first, second and third expansion modules 102b-102d. The first, second and third expansion modules 102b-102d are adapted to be serially connected together in a row with the input locations facing in a first direction (e.g., up) and the plug and play expansion connection locations facing in an opposite direction (e.g., down). Additionally, the input locations are on proximal sides (e.g., sides closest to the base module) of the modules while the plug and play expansion connection locations are on distal sides (e.g., sides farthest from the base module) of the modules. In contrast, for the fourth expansion module 102e, the input location 110e is located on the distal side of the module housing 106e and the plug and play expansion connection location 112e is located on the proximal side of the module housing 106e. The input location 110e has an extended arm 260e and is configured to mate with the plug and play expansion connection location 112d of the third expansion module 102d. When the fourth expansion module 102e is mated with the third expansion module 102d, a main body of the expansion module housing 106e tucks under the main body of the third expansion module housing 106d. The fourth expansion module 102e includes an asymmetric splitter 107e that splits an optical signal from the input location 110e between the optical output port 108e and the plug and play expansion connection location 112e. The asymmetric splitter 107e has an 80/20 bias such that 20% of the signal is directed to the optical output port 108e and the remaining 80% of the signal is directed to the plug and play expansion connection location 112e.

Figure 12:
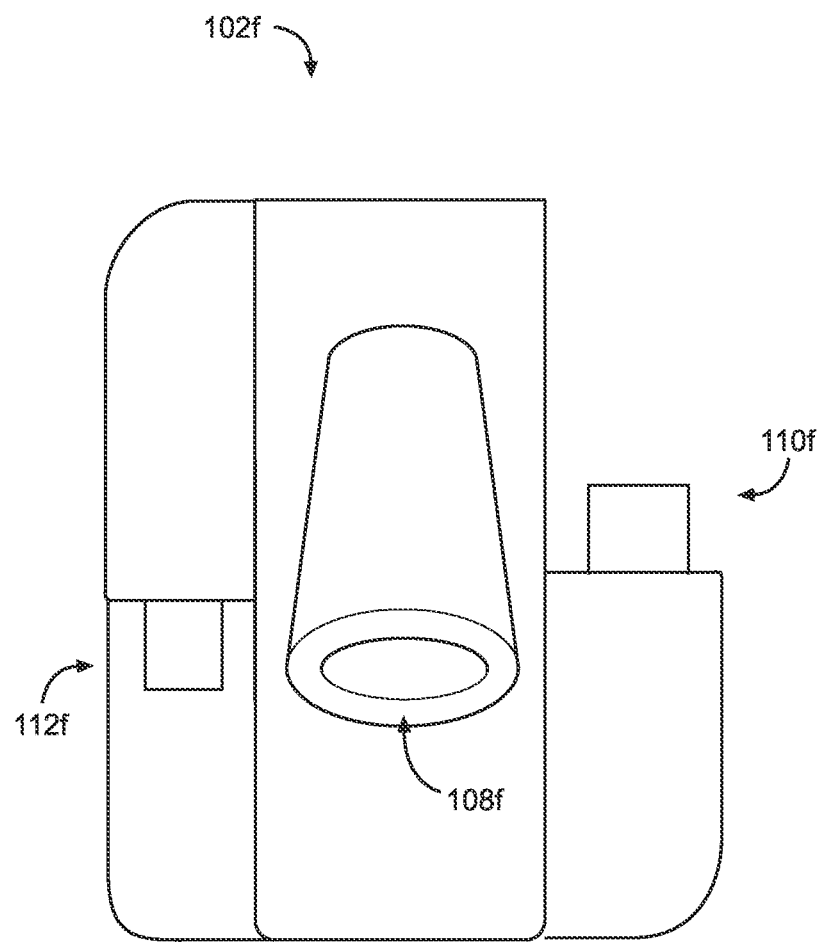
FIG. 12 depicts another in-line expansion module configuration for an expansion module of the modular terminal of FIG. 3.
Figure 13:
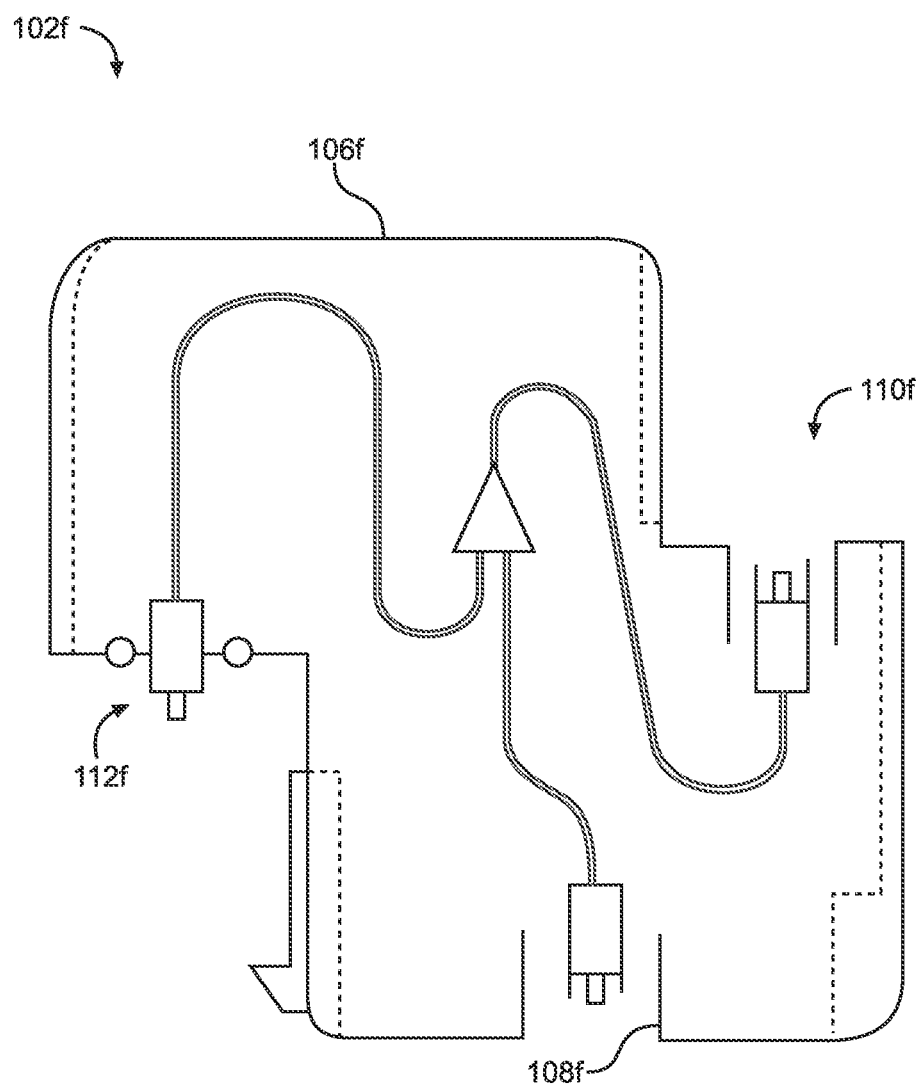
FIG. 13 is a schematic view of the expansion module of FIG. 12.

FIGS. 12 and 13 depict the fifth expansion module 102f. The fifth expansion module 102f includes a module housing 106f carrying an optical output location 108f, an optical input location 110f and an expansion connection location 112f. The input location 110f and the expansion connection location 112f include connection arrangements with optical connectors that face in opposite directions. The input location 110f is located at the distal side of the module housing 106f while the expansion connection location 112f is located at the proximal side of the module housing 106f. This configuration allows the input location 110f of the fifth expansion module 102f to be coupled to the expansion connection location 112e of the fourth expansion module 102e and allows a second row of modules to be started arranged parallel to the first row of modules defined by the modules 102a-102d. The input location 102f is adapted to mechanically and optically connect to the expansion connection location 102e of the fourth expansion module 102e by a plug and play connection. The fifth expansion module 102f contains an asymmetric power splitter 107f for splitting optical power from an optical signal directed to the input location 110f to the output location 108f and the expansion connection location 112f In one example, the asymmetric power splitter 107f has a 70/30 bias such that 30% of the optical signal is directed to the optical output port 108f and the remaining 70% of the signal is directed to the expansion connection location 112f.

The sixth expansion module 102g (see FIG. 3) has the same module configuration as the fifth expansion module 102f and includes a module housing 106g carrying an optical output location 108g, an optical input location 110g and an expansion connection location 112g. The input location 110g is adapted to mechanically and optically couple with the expansion connection location 112f of the fifth expansion module 102f via a plug and play connection. When coupled to the fifth expansion module 102f, the sixth extension module 102g continues the second row of modules in a direction back towards the base module 102a. The sixth expansion module 102g has an optical power splitter for splitting an optical signal input to the sixth expansion module 102g through the input location 110g. In one example, the splitter is not an asymmetric splitter and evenly splits power such that 50% of the signal is directed to the optical output location 108g and the remaining 50% of the signal is directed to the expansion connection location 112g.

Figure 14:
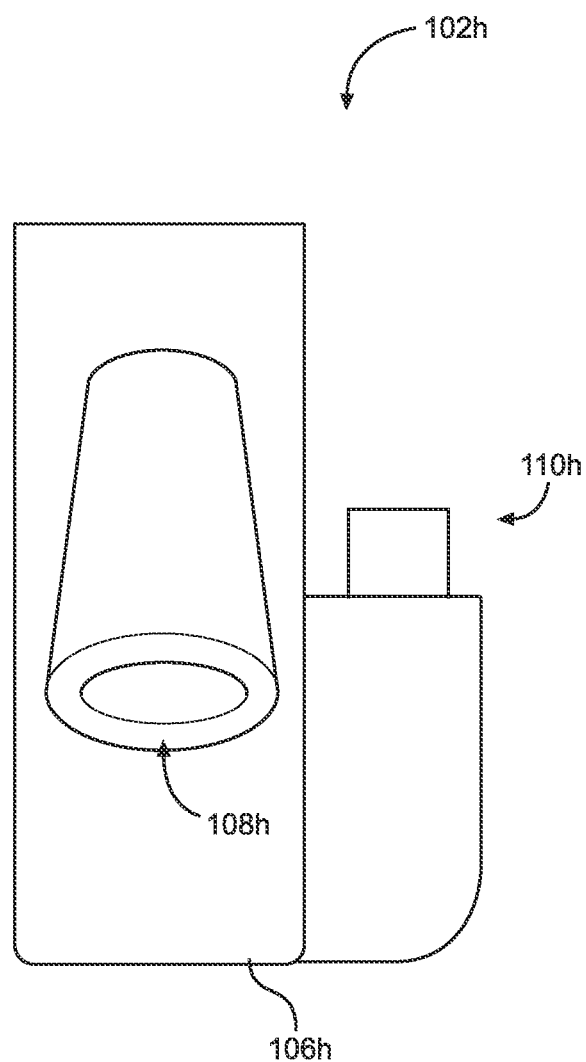
FIG. 14 depicts an end expansion module of the modular terminal of FIG. 3.
Figure 15:
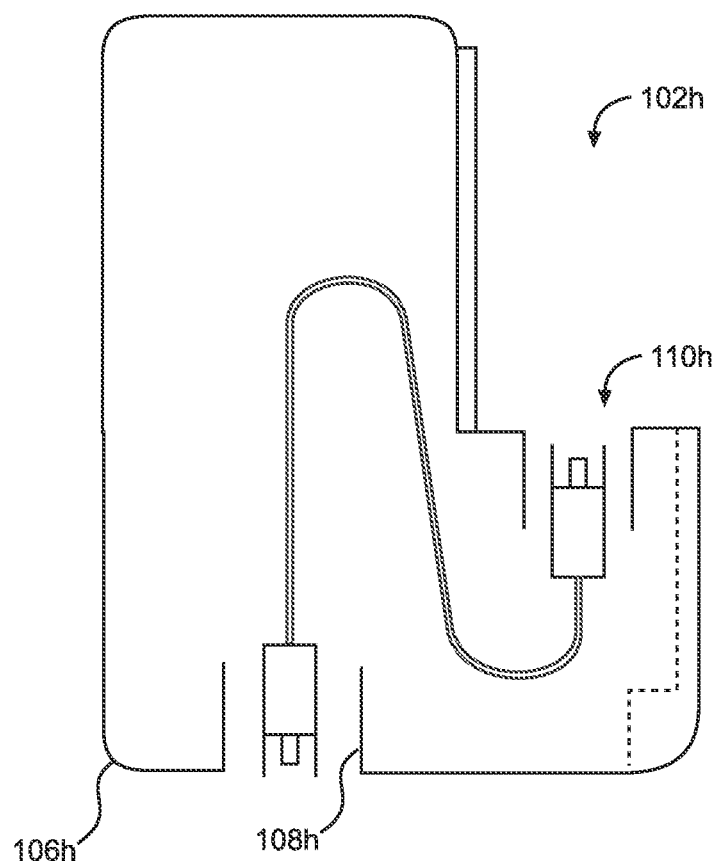
FIG. 15 is a schematic view of the expansion module of FIG. 14.

FIGS. 14 and 15 depict the end module 102h. The end module 102h includes a module housing 106h having an optical output location 108h and an optical input location 110h. The end module 102h preferably does not include an internal optical power splitter and the optical output location 108h is coupled by an optical fiber 270h to the input location 110h without optical splitting. The input location 110h is adapted to mechanically and optically couple with the expansion connection location 112g of the sixth expansion module 102g by a plug and play connection. With the end module 102h coupled to the sixth expansion module 102g, the terminal 100 reaches its full capacity and includes two rows of modules each including the same number of modules (e.g., four modules). The end module 102h mounts beneath the base module 102a.

Figure 16:
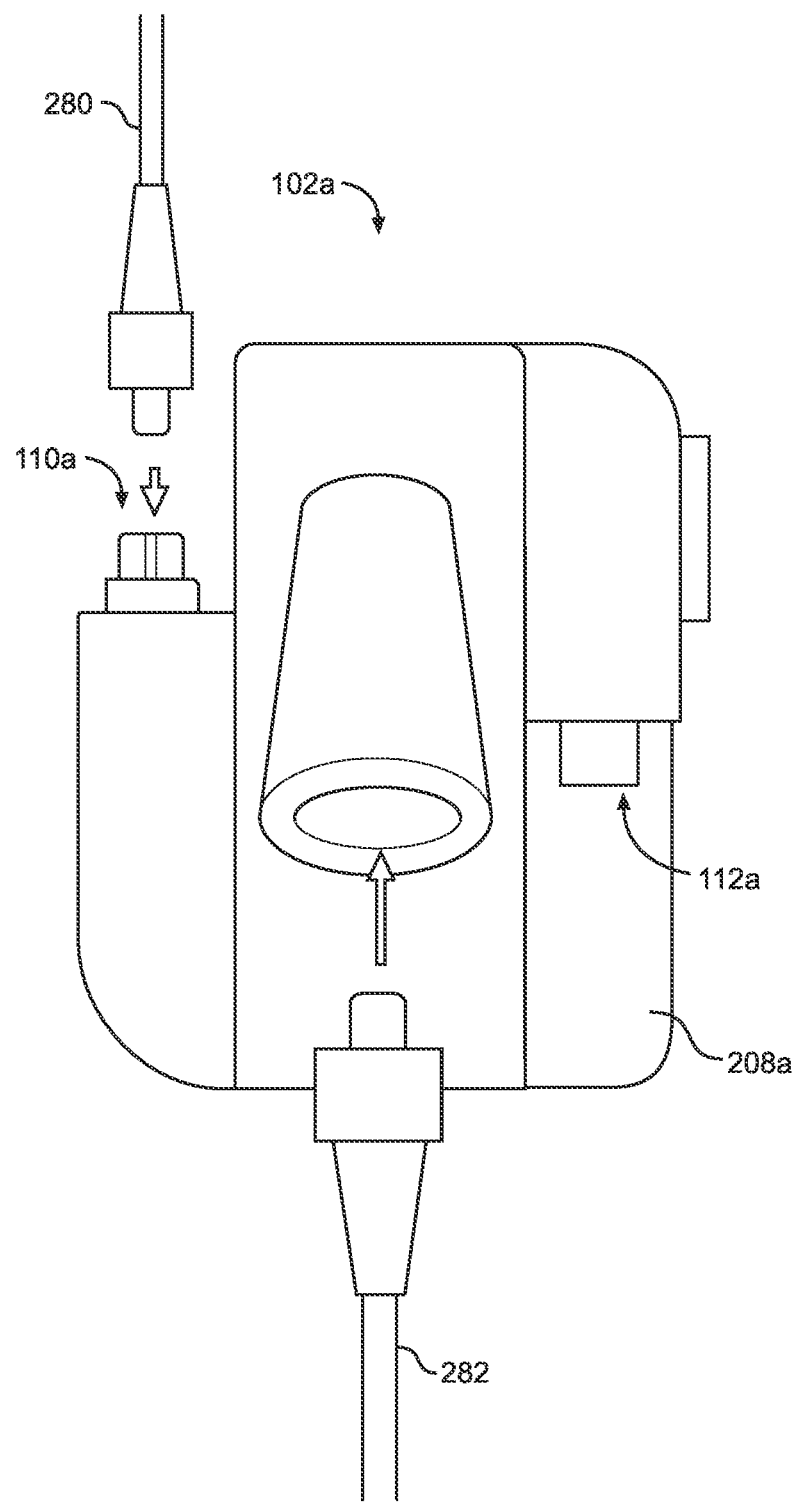
FIG. 16 depicts the base module of the modular terminal of FIG. 3 being installed in the field and coupled to a drop cable.

FIG. 16 shows the base module 102a initially being installed in the field. As depicted, an input cable 280 is coupled to the input location 110a of the base module 102a by a connectorized connection. Also, a subscriber is coupled to the optical output location 108a via a drop cable 282. A protective structure such as a sleeve or dust cap 208a is mounted over the plug and play expansion connection location 112a to protect the plug and play expansion connection location 112a from contamination.

Figure 17:
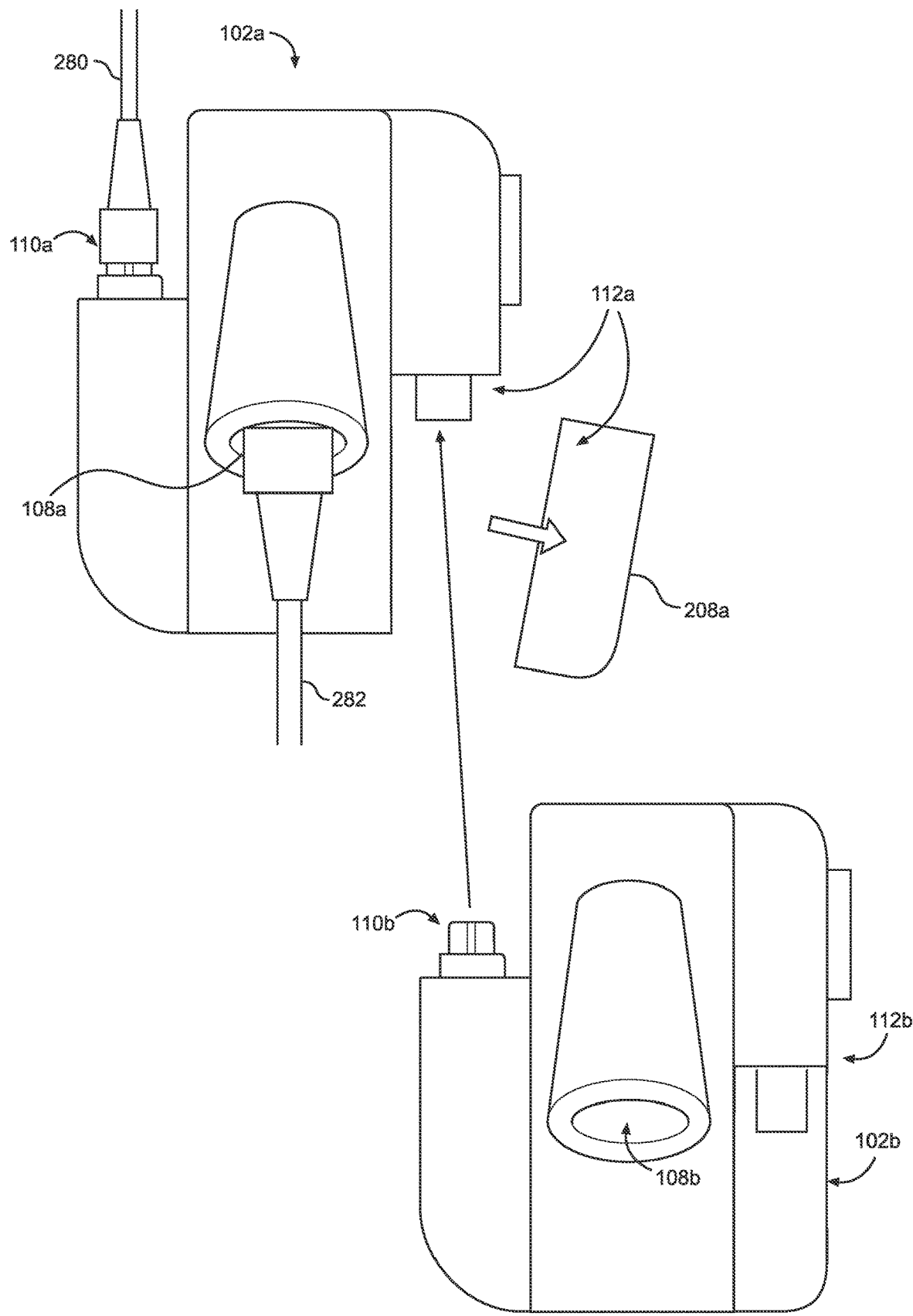
FIG. 17 depicts one of the expansion modules of the modular terminal of FIG. 3 in the process of being coupled to the base module of the terminal.

FIG. 17 depicts a process step for securing the first expansion module 102b to the base module 102a. As part of the step, the protective sleeve is removed from the plug and play expansion connection location 112a. Next, the input location 110b of the first expansion module 102b is aligned with the plug and play expansion connection location 112a of the base module 102a. The modules 102a, 102b are then linearly slid together to interlock and mate the modules 102a, 102b. In certain examples, one or more locking interfaces such as tongue and groove interfaces can be provided for increasing the robustness of the connection. Seals can also be provided. Additionally, one or more latches can be provided for securing the modules together. In certain examples, one of the modules includes a fiber optic adapter having a first port receiving a fiber optic connector within the module and a second port adapted to receive a fiber optic connector carried by the second module.

Figure 18:
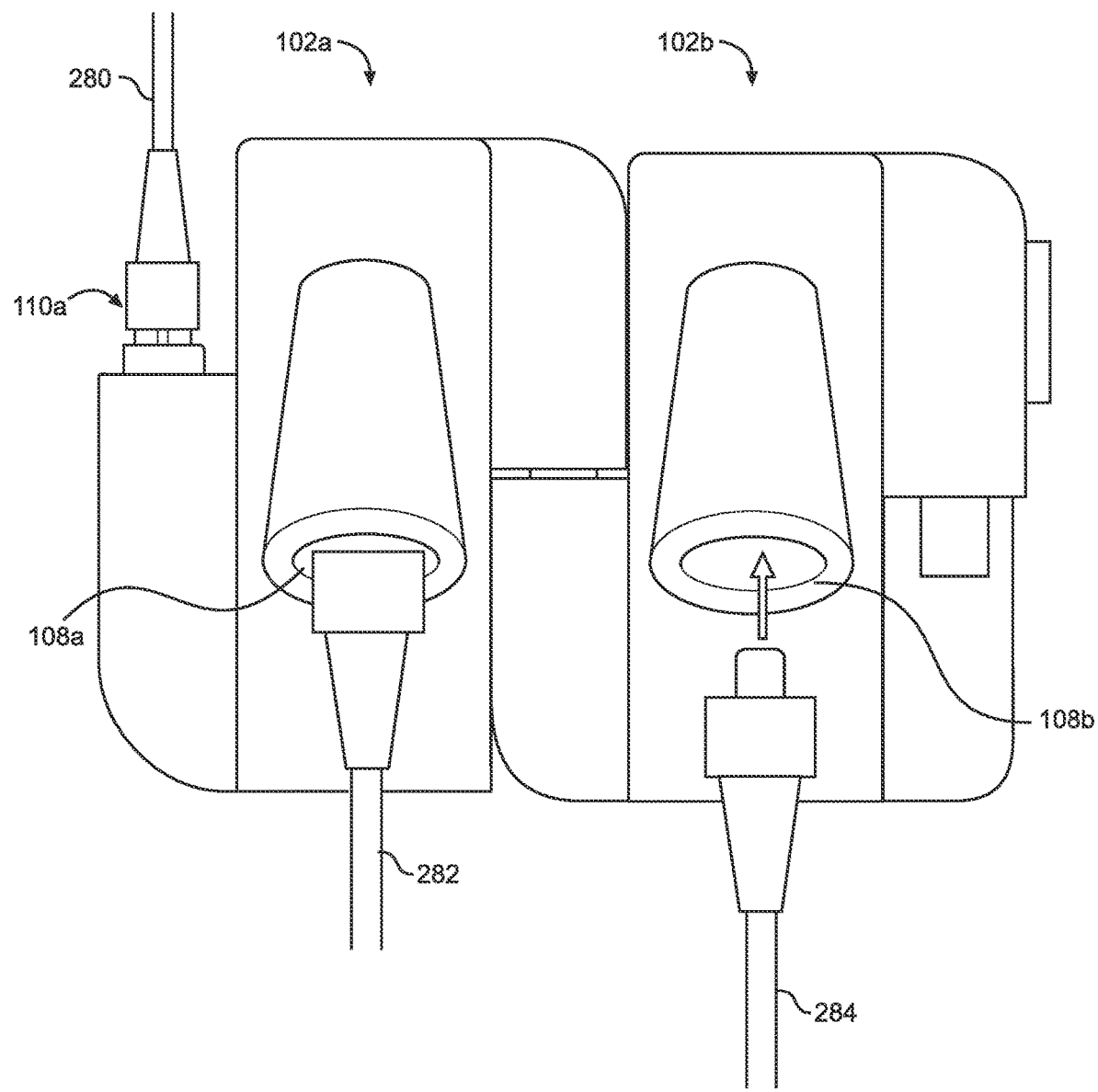
FIG. 18 depicts the expansion module of FIG. 17 coupled to the base module.

FIG. 18 shows the base module 102a and the first expansion module coupled 102b together. A second drop cable 284 s shown being inserted into the optical output location 108b for connecting a second subscriber to the terminal 100.

Figure 19:
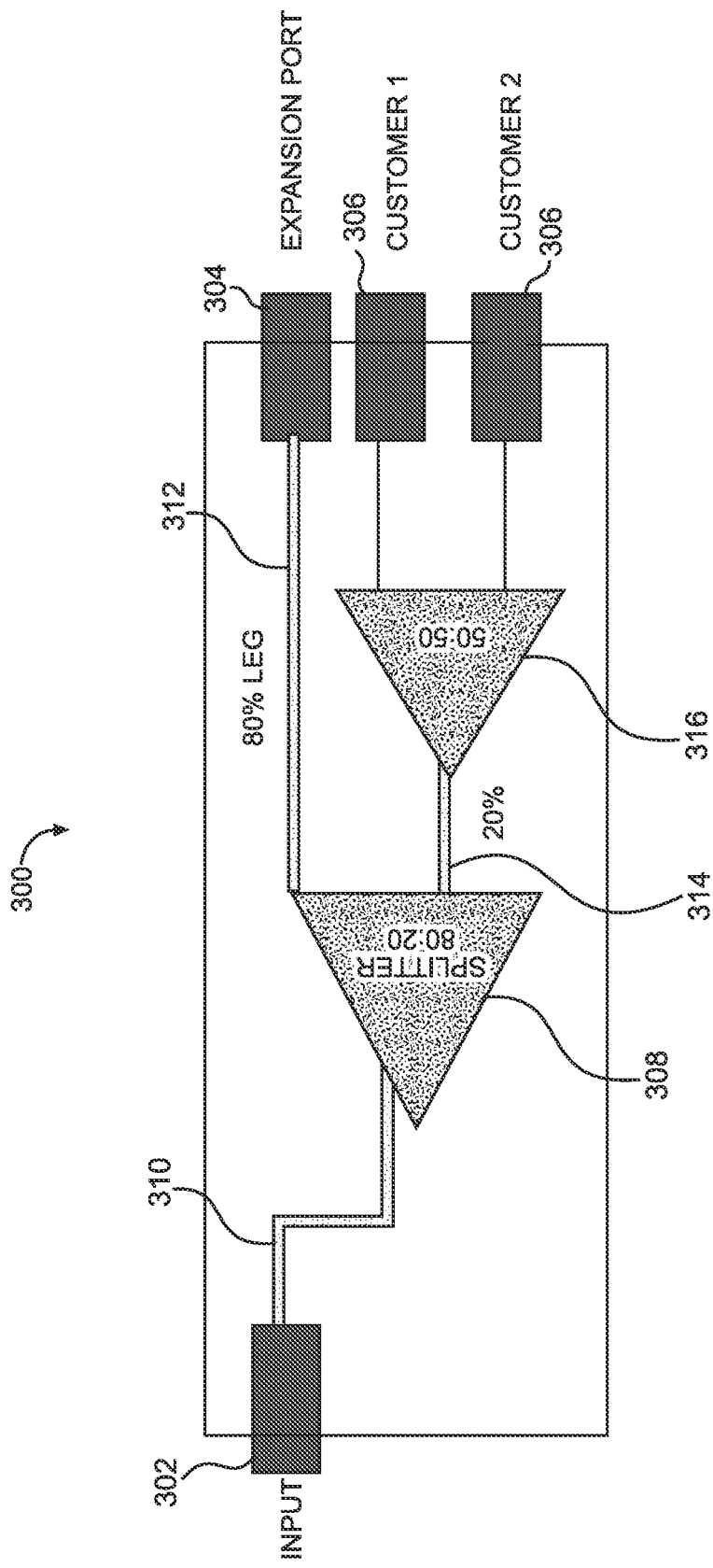
FIG. 19 shows an alternative module tapping configuration with multiple output locations.

It will be appreciated that in alternative examples, the base module and/or the expansion modules can have more than one ruggedized output location (e.g., more than one ruggedized output port). For example, FIG. 19 depicts an example module configuration 300 having an input location 302, an expansion connection location 304 and two ruggedized output locations 306 (e.g., fiber optic adapters with ruggedized outer ports). An asymmetric splitter 308 receives signals from the input location 302 via an input line 310, and asymmetrically splits the signals such that a majority of the signal power is output from the splitter 308 through a pass-through output line 312 to the expansion connection location 304 and a minority of the signal power is output from the splitter 308 through a tap line 314. The signal in the tap line 314 is split by a symmetric optical power splitter 316 and directed to the output locations 306. In other examples, other splitting configurations can be used, and in other examples more than 2 output ports may be provided. In certain example, the asymmetric splitter may have integrated splitting that provides multiple tap outputs carrying the same power level thereby eliminating the need for a separate symmetric power splitter.

Figure 20:
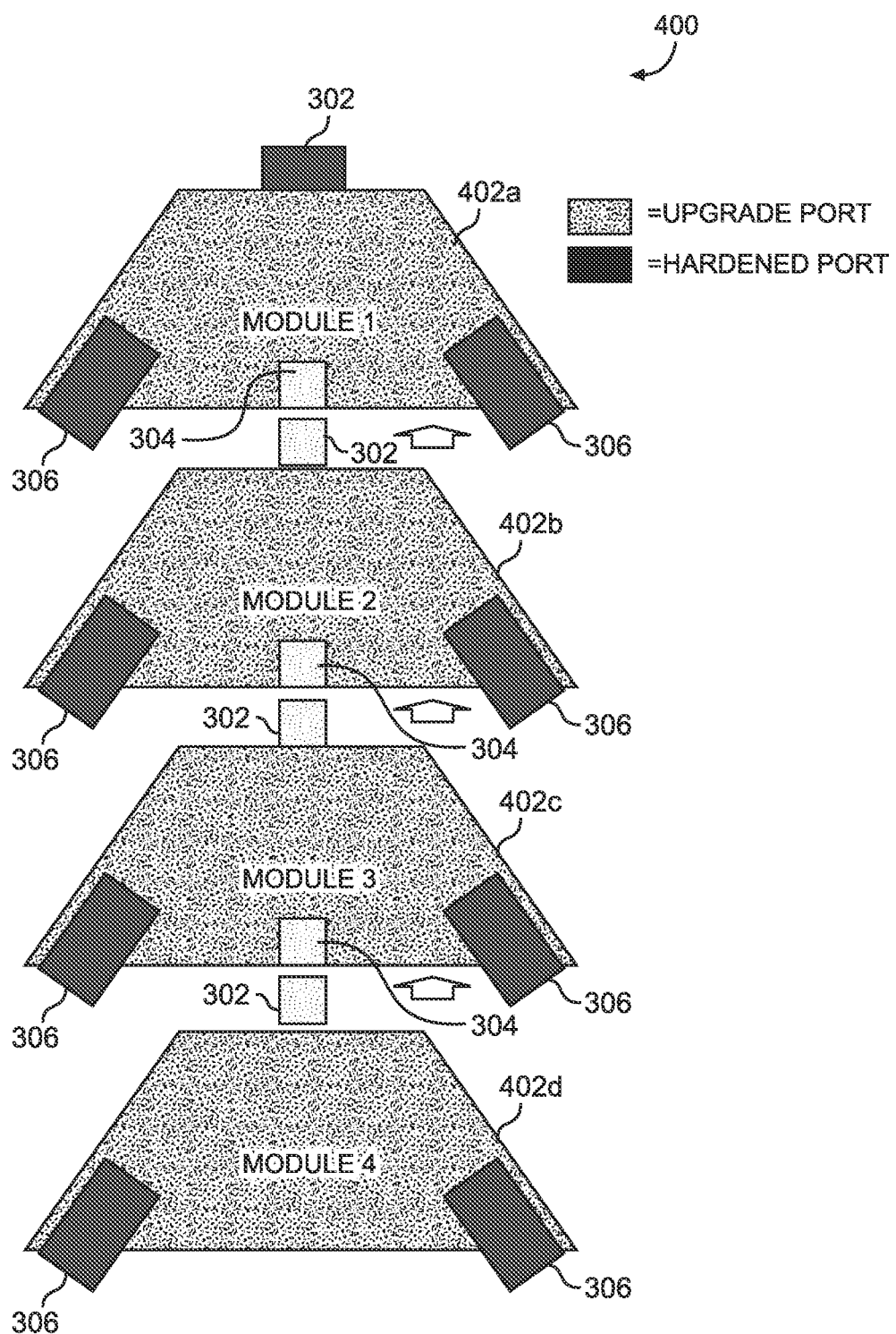
FIG. 20 depicts another modular terminal in accordance with the principles of the present disclosure.

FIG. 20 shows an example terminal 400 constructed from modules 402a-402d that can be stacked and interlocked together in series in a vertical row. At least the modules 402a-402c can have a module tapping architecture like the module configuration 300 including an input location 302, an expansion connection location 304 and two output connection locations 306. Module 402a can be a base module and module 402d can be an end module and can have symmetric splitting. The tap ratios can vary between the modules 402a-402c to provide relatively uniform power level outputs at each of the output ports of the terminal.

Example ruggedized fiber optic adapter ports and ruggedized fiber optic adapters are disclosed by U.S. Pat. Nos. 9,557,493; 7,568,844; 9,122,021; 7,264,402; and 7,744,288, which are hereby incorporated by reference in their entireties. It will be appreciated that terminals in accordance with the principles of the present disclosure can include ports and/or connectors and/or interfaces that are compatible with any of the adapters or connectors disclosed in the above patents.

What is claimed is:
1. A terminal comprising:
a plurality of modules adapted to be sequentially assembled together in a serial chain to build the terminal, at least some of the modules each including:
a module housing,
a ruggedized optical output port provided on the module housing,
a plug and play input connection location,
a plug and play expansion connection location provided on the module housing, and
an asymmetric power splitter within the module housing for splitting optical power from the plug and play input location asymmetrically between the rugge- dized optical output port and the plug and play expansion connection location, and wherein the plug and play input connection locations and the plug and play expansion connection locations are adapted to mate with respect to one another.

2. The terminal of claim 1, wherein the modules include a base module coupled to an input fiber optic cable or adapted to be coupled to the input optical cable, the base module including: a base module housing, at least one of the ruggedized optical output ports being provided on the base module housing, at least one of the plug and play expansion connection locations being provided on the base module housing, and at least one of the asymmetric power splitters being disposed within the base module housing for splitting optical power from the input fiber optic cable asymmetrically between the at least one of the ruggedized optical output ports and the at least one of the plug and play expansion connection locations.

3. The terminal of claim 1, wherein the modules include an end module including: an end module housing, at least one of the ruggedized optical ports being provided on the end module housing, at least one of the plug and play input connection locations being provided on the end module housing, wherein the at least one of the plug and play input connection locations is optically connected to the at least one of the ruggedized optical output ports, and wherein the end module does not include an asymmetric power splitter and does not include any of the plug and play expansion connection locations.

4. The terminal of claim 3, wherein the modules include intermediate modules that mount sequentially between the base module and the end module.

5. The terminal of claim 1, wherein at least some of the modules are in-line modules adapted to couple consecutively together in a row.

6. The terminal of claim 5, wherein the modules include a wrap-around module adapted to couple to an in-line module of a first row of modules and to an in-line module of a second row of modules, the first and second rows of modules being parallel to and adjacent to each other.

7. The terminal of claim 1, wherein at least some of the modules include asymmetric slitters having different optical power split ratios.

8. The terminal of claim 1, wherein the plug and play input connection locations of the modules face in first directions and the plug and play expansion connection locations of the modules face in opposite second directions.

9. The terminal of claim 1, wherein each of the modules includes a single one of the ruggedized optical output ports.

10. A terminal comprising:
a plurality of modules adapted to be sequentially assembled together to build the terminal, at least some of the modules each including:
a module housing,
a ruggedized optical output port provided on the module housing, and
an asymmetric power splitter disposed within the module housing, the asymmetric power splitter being adapted for tapping optical power from an optical signal transmitted through the terminal and for outputting a tapped portion of the optical signal through the ruggedized optical output port, the module housings being configured to be mechanically coupled together to form an integrated terminal structure.

11. The terminal of claim 10, wherein the modules are coupled together by plug-and-play optical connections.

12. The terminal of claim 11, wherein the plug-and-play optical connections include fiber optic connectors mounted to the module housings and fiber optic adapters mounted to the module housings.

13. The terminal of claim 10, wherein the asymmetric power splitters of different ones of the modules have different power split ratios.

14. A terminal comprising:
a plurality of modules adapted to be sequentially assembled together to build the terminal, the modules including:
a base module including a base module housing, the base module including a ruggedized optical output port and a plug and play expansion connection location provided at the base module housing, the base module also including an asymmetric power splitter within the base module housing for splitting optical power from an optical input asymmetrically between the ruggedized optical output port and the plug and play expansion connection location;
a first expansion module including a first expansion module housing, the first expansion module including a ruggedized optical output port, a plug and play input connection location, and a plug and play expansion connection location provided at the first expansion module housing, the first expansion module also including an asymmetric power splitter within the first expansion module housing for splitting optical power of an optical signal received through the plug and play input connection location of the first expansion module asymmetrically between the ruggedized optical output port and the plug and play expansion connection location of the first expansion module, the plug and play input connection location of the first expansion module being adapted to optically and mechanically couple to the plug and play expansion connection location of the base module; and
a second expansion module including a second expansion module housing, the second expansion module including a ruggedized optical output port, a plug and play input connection location, and a plug and play expansion connection location provided at the second expansion module housing, the second expansion module also including an asymmetric power splitter within the second expansion module housing for splitting optical power of an optical signal received through the plug and play input connection location of the second expansion module asymmetrically between the ruggedized optical output port and the plug and play expansion connection location of the second expansion module, the plug and play input connection location of the second expansion module being adapted to optically and mechanically couple to the plug and play expansion connection location of the first expansion module.

15. The terminal of claim 14, wherein the asymmetric power splitters of the first and second expansion modules have different split ratios.

16. The terminal of claim 15, wherein the split ratios of the asymmetric power splitters of the first and second expansion modules are each the ratio of the power provided to the respective expansion connection location versus the power provided to the respective ruggedized optical output port, and wherein the split ratio of the asymmetric power splitter of the first expansion module is higher than the split ratio of the asymmetric power splitter of the second expansion module.

17. The terminal of claim 14, wherein the plug and play input connection locations of the first and second expansion modules face in first directions and the plug and play expansion connection locations face in opposite second directions.

18. The terminal of claim 14, wherein the base module, the first expansion module and the second expansion module are assembled together in a row.

19. The terminal of claim 14, further comprising a third expansion module including a third expansion module housing, the third expansion module including a ruggedized optical output port, a plug and play input connection location, and a plug and play expansion connection location provided at the third expansion module housing, the third expansion module also including an asymmetric power splitter within the third expansion module housing for splitting optical power of an optical signal received through the plug and play input connection location of the third expansion module asymmetrically between the ruggedized optical output port and the plug and play expansion connection location of the third expansion module, the plug and play input connection location of the third expansion module being adapted to optically and mechanically couple to the plug and play expansion connection location of the second expansion module.

20. The terminal of claim 19, wherein the base module, the first expansion module, the second expansion module, and the third expansion module mount together to form a first row, and wherein the terminal further includes a fourth expansion module, a fifth expansion module, a sixth expansion module and an end module that mount together to form a second row parallel to the first row, the fourth expansion module coupling to the third expansion module by a wrap-around plug and play connection, the fifth expansion module coupling to the fourth expansion module by an in-line plug and play connection, the sixth expansion module coupling to the fifth expansion module by an in-line plug and play connection, the end module coupling to the sixth expansion module by an in-line plug and play connection, the end module being positioned beneath the base module and not including an optical splitter, and the sixth expansion module including a 50-50 optical power splitter.

* * * * *